United States Patent
Gil

(10) Patent No.: US 6,199,581 B1
(45) Date of Patent: Mar. 13, 2001

(54) TOILET TANK FILL VALVE WITH ADJUSTABLE STANDPIPE

(75) Inventor: Amos Gil, Farmington Hills, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 0 days.

(21) Appl. No.: 09/420,990

(22) Filed: Oct. 20, 1999

Related U.S. Application Data

(60) Provisional application No. 60/140,575, filed on Jun. 23, 1999.

(51) Int. Cl.[7] .............................. F16K 31/26; F16K 31/34
(52) U.S. Cl. ............................................. 137/426; 137/437
(58) Field of Search ................................... 137/426, 436, 137/437

(56) References Cited

U.S. PATENT DOCUMENTS

| | | | |
|---|---|---|---|
| 4,094,327 | 6/1978 | Brandelli | 137/426 |
| 4,182,364 | 1/1980 | Gilbert et al. | 137/426 |
| 4,186,765 | 2/1980 | Anderson | 137/426 |
| 4,646,779 | * 3/1987 | Johnson | 137/426 |
| 4,945,944 | 8/1990 | Chen | 137/426 |
| 5,211,204 | * 5/1993 | Mikol | 137/410 |
| 5,255,703 | 10/1993 | Johnson | 137/426 |
| 5,287,882 | * 2/1994 | Mikol | 137/410 |
| 5,421,361 | 6/1995 | Johnson | 137/426 |
| 5,439,025 | 8/1995 | Johnson | 137/426 |
| 5,715,859 | * 2/1998 | Nichols-Roy | 137/426 |
| 5,904,176 | * 5/1999 | Li | 137/434 |
| 5,964,247 | * 10/1999 | Johnson | 137/414 |

* cited by examiner

Primary Examiner—George L. Walton
(74) Attorney, Agent, or Firm—Edagr A. Zarins; Lloyd D. Doigan

(57) ABSTRACT

A toilet tank fill assembly incorporating a standpipe which is adjustable along a plurality of discrete positions to adjust the height of the fill valve within the tank. The standpipe includes a fixed tube which is secured to the inlet port of the tank and an adjustable tube matingly attached to the fixed tube and carrying the fill valve at an upper end. The fixed tube has a plurality of peripheral camming grooves which represent the discrete positions of adjustment. The adjustable tube includes a slot receiving a locking clip designed to engage the grooves of the fixed tube to selectively prevent telescoping adjustment of the tubes. Rotation of the adjustable tube removes the clip from the groove allowing adjustment of the standpipe length.

20 Claims, 5 Drawing Sheets

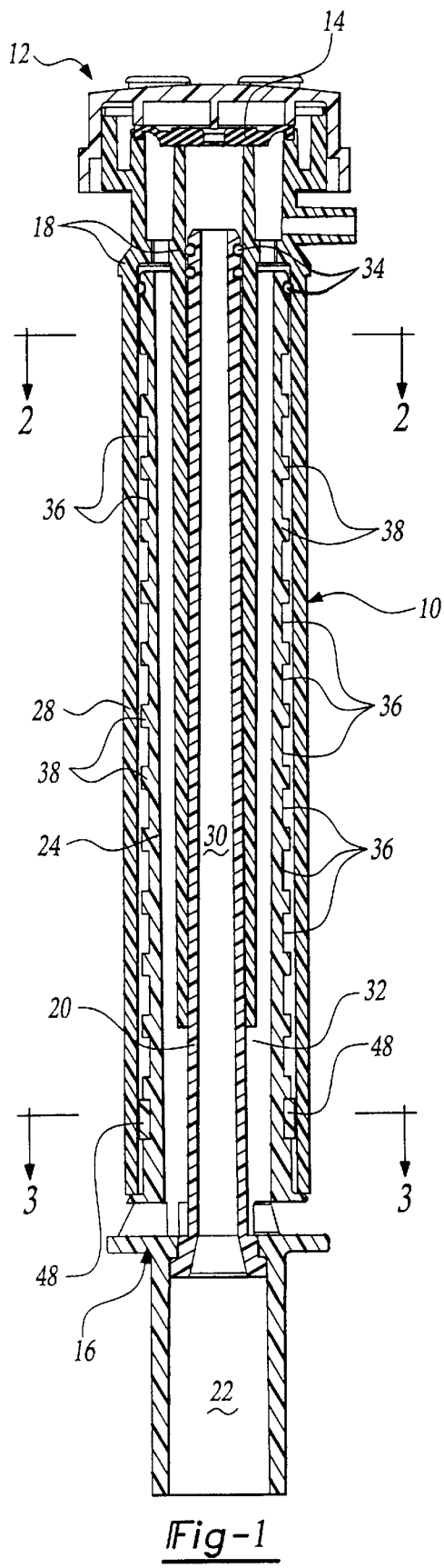
Fig-1
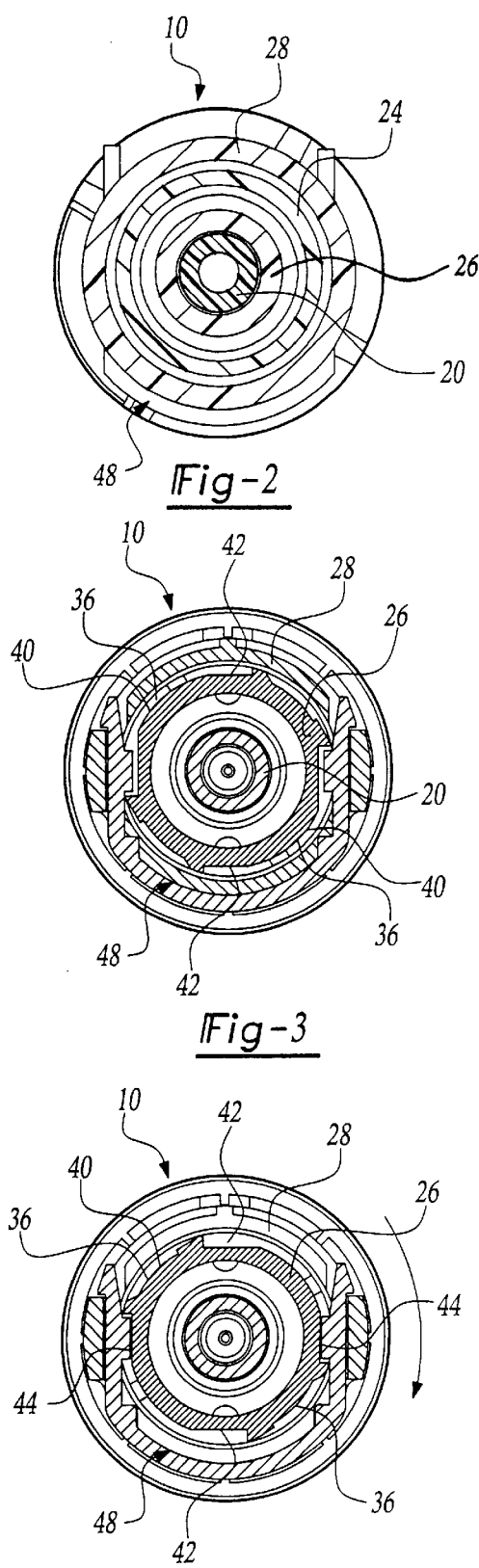
Fig-2
Fig-3
Fig-3a

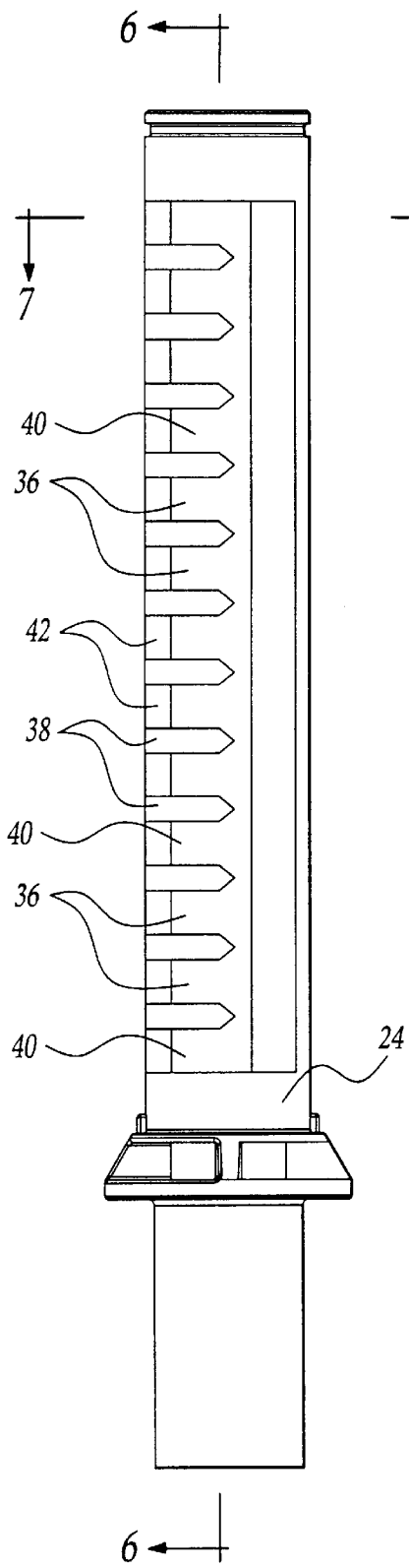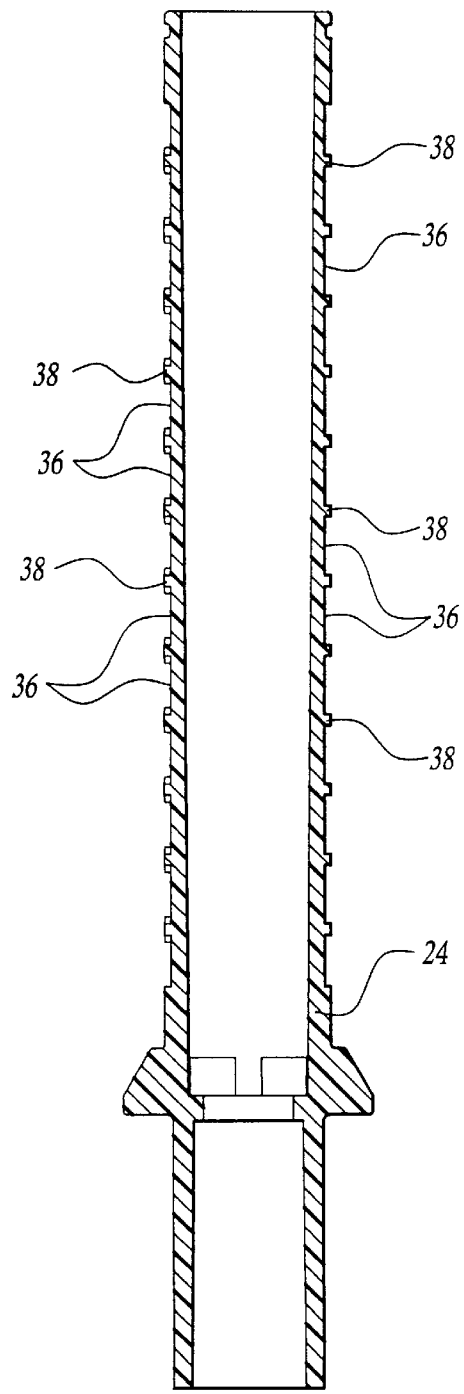
Fig-5
Fig-6

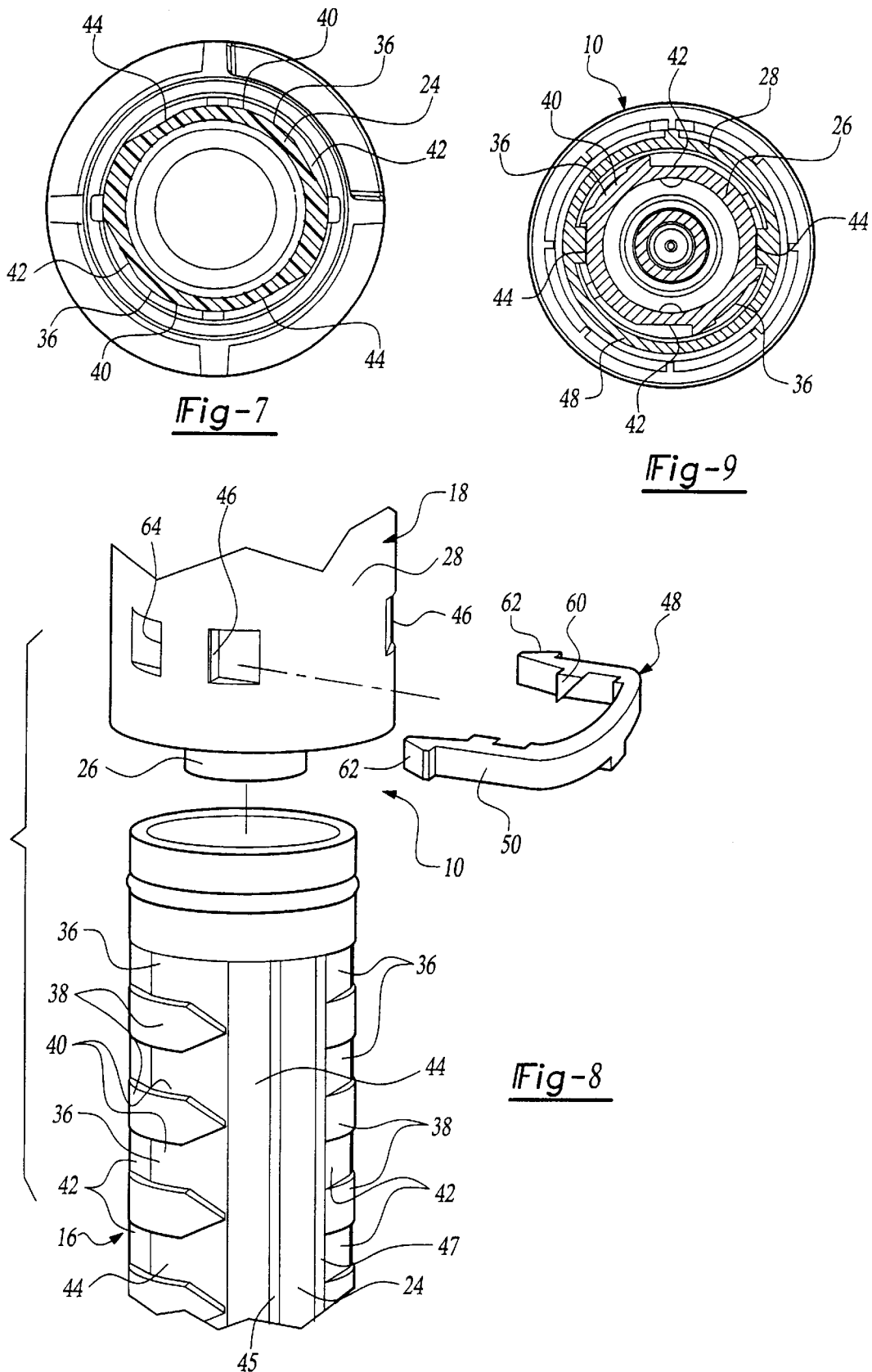

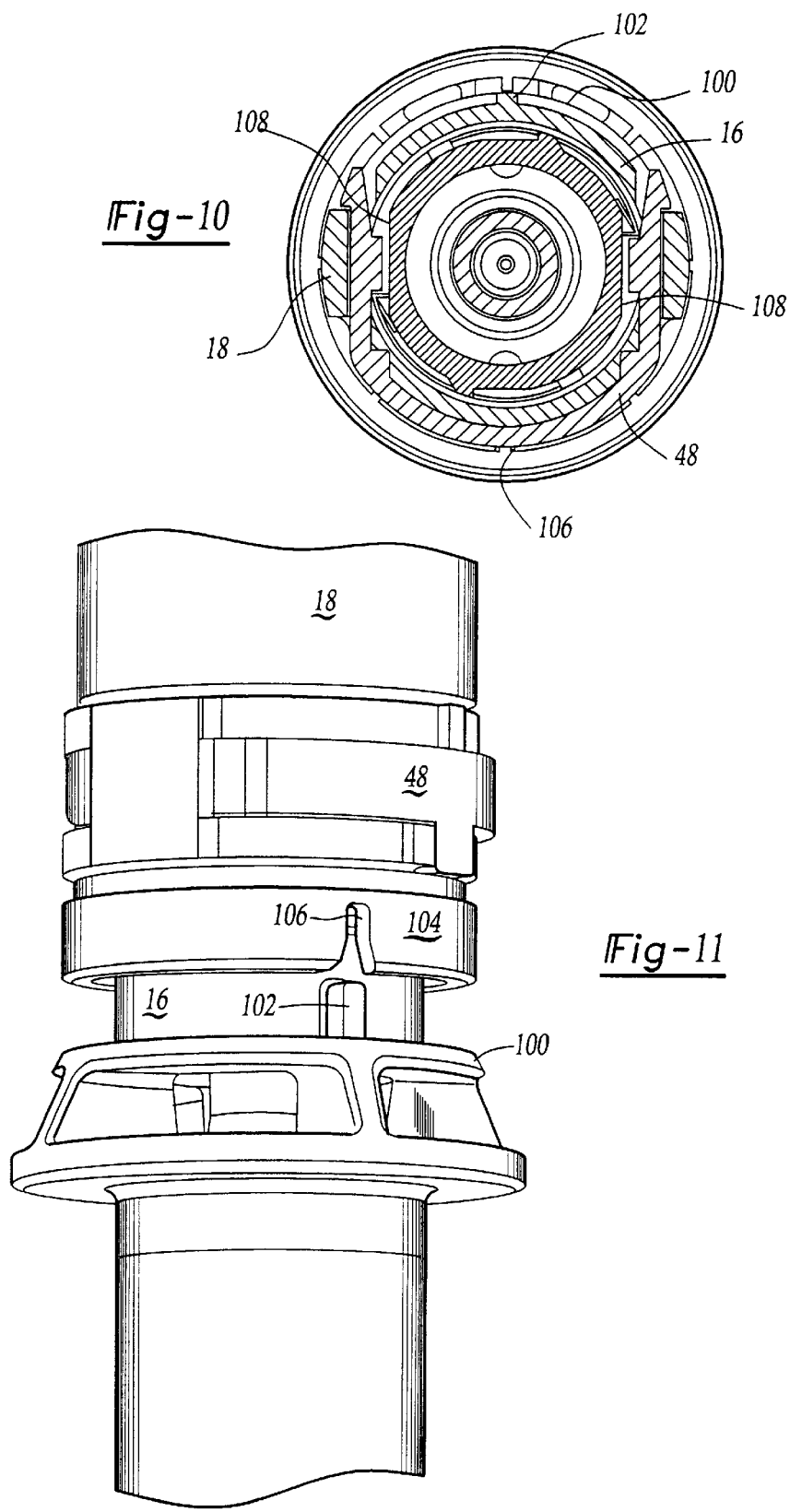

TOILET TANK FILL VALVE WITH ADJUSTABLE STANDPIPE

RELATED APPLICATIONS

This application claims priority from U.S. Provisional Application No. 60/140,575 filed on Jun. 23, 1999.

BACKGROUND OF THE INVENTION

I. Field of the Invention

The instant invention relates to fill valves with floats, and, in particular, to toilet tank fill valves having a conveniently adjustable valve stem to vary the position of the valve within the toilet tank.

II. Description of the Prior Art

Toilet tank fill valves with ballcocks are well known and in common usage. However, the conventional valve assemblies have suffered from several disadvantages, including noise, clogging of the diaphragm valve due to foreign bodies, unwieldy design due to the presence of a conventional ballcock, while also complicating adjustment of the valve within the tank. Prior known toilet fill valves may employ a ball float depending from an actuator arm or a float reciprocally mounted to the mounting tube for actuation of the fill valve when the fluid level drops below a predetermined level. As the water level reaches a full position, the buoyancy of the float will cause the fill valve to shut off. It is desirable for the valve to fill the reservoir as quickly as possible by maintaining a near maximum fluid flow until shut off of the valve.

In order to accommodate different tank sizes, particularly tank depths, the fill valves are provided with means for adjusting the position of the valve and/or float. Early fill valves merely adjusted the angle of the actuator arm associated with the ball float. In fill assemblies with reciprocating floats, the height of the valve above the tank floor needs to be adjusted. More recently, fill assemblies have been provided with adjustable standpipes to optimize the position of the fill valve for proper water depth. However, these adjustment assemblies have been found to be awkward and clumsy, in some instances, requires removal from the tank to adjust the length of the standpipe.

SUMMARY OF THE PRESENT INVENTION

The present invention overcomes the disadvantages of the prior known reservoir fill assemblies by providing an efficient fill valve for filling the tank and an easily adjustable standpipe for optimizing the position of the fill valve within the tank.

The invention relates to an adjustable standpipe for a water level control valve with a float for use in tanks such as flush tanks for toilets. The valve is mounted on the upper end of a vertical standpipe through which flush water is supplied. An outlet or discharge tube surrounds an inlet tube and is concentric therewith. The diaphragm valve member is disposed at the top or upper end of the standpipe and functions to open and close the water inlet passage in the standpipe. The diaphragm valve member is disposed in a housing and together with the housing defines a vent valve chamber above the diaphragm.

A float member is preferably an inverted cup shape and is slidably mounted on the discharge pipe. The float is linked to a stem actuator member which is pivotally mounted on the housing. When the water level in the tank drops, as for example when the toilet is flushed, the float member drops and the link pivots to actuate the fill valve. When the water level in the tank rises it will carry the float with it. The stem actuator member then disengages the vent valve thereby closing the fill valve.

In order to properly position the valve and therefore the float within the tank, the fill assembly is provided with means for adjusting the length of the standpipe to accommodate different tank depths. The standpipe includes mating inlet and outlet tubes which direct water to the fill valve and into the tank, respectively. The fixed outlet tube incorporates a plurality of discrete camming grooves defining the positions of adjustment. The slidable outlet tube has a set of slots adapted to receive a flexible locking ring which selectively engages the camming grooves of the fixed tube to lock the slidable tube relative to the fixed tube. The locking ring is movable between a retracted position allowing adjustment of the standpipe and an inserted position preventing movement. The adjustment assembly provides convenient adjustment yet positive locking against movement. In a preferred embodiment, the locking ring has a triangular tooth to ensure insertion of the locking ring into the grooves to fix the position of the fill tube. In a still further embodiment, a locking clip is formed on the inner diameter of the adjustable tube which selectively interacts with the grooves of the fixed pipe to alter the length of the standpipe.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a cross-sectional view of a fill assembly embodying the present invention;

FIG. 2 is a transverse cross-section taken along lines 2—2 of FIG. 1;

FIG. 3 is a transverse cross-section of the adjustable standpipe moving towards an unloaded position;

FIG. 5 is an elevational view of the fixed outlet tube;

FIG. 6 is a cross-sectional view of the fixed tube taken along lines 6—6 of FIG. 5;

FIG. 7 is a transverse cross-sectional view of the fixed tube taken along lines 7—7 of FIG. 5;

FIG. 8 is a partial exploded view of the locking mechanism of the present invention;

FIG. 9 is a cross-sectional view of an alternative embodiment of the locking mechanism;

FIG. 10 is a cross-sectional view of the base of the fill valve; and

FIG. 11 is a perspective view of the back of the fill valve.

DETAILED DESCRIPTION OF A PREFERRED EMBODIMENT OF THE PRESENT INVENTION

Figure 4:
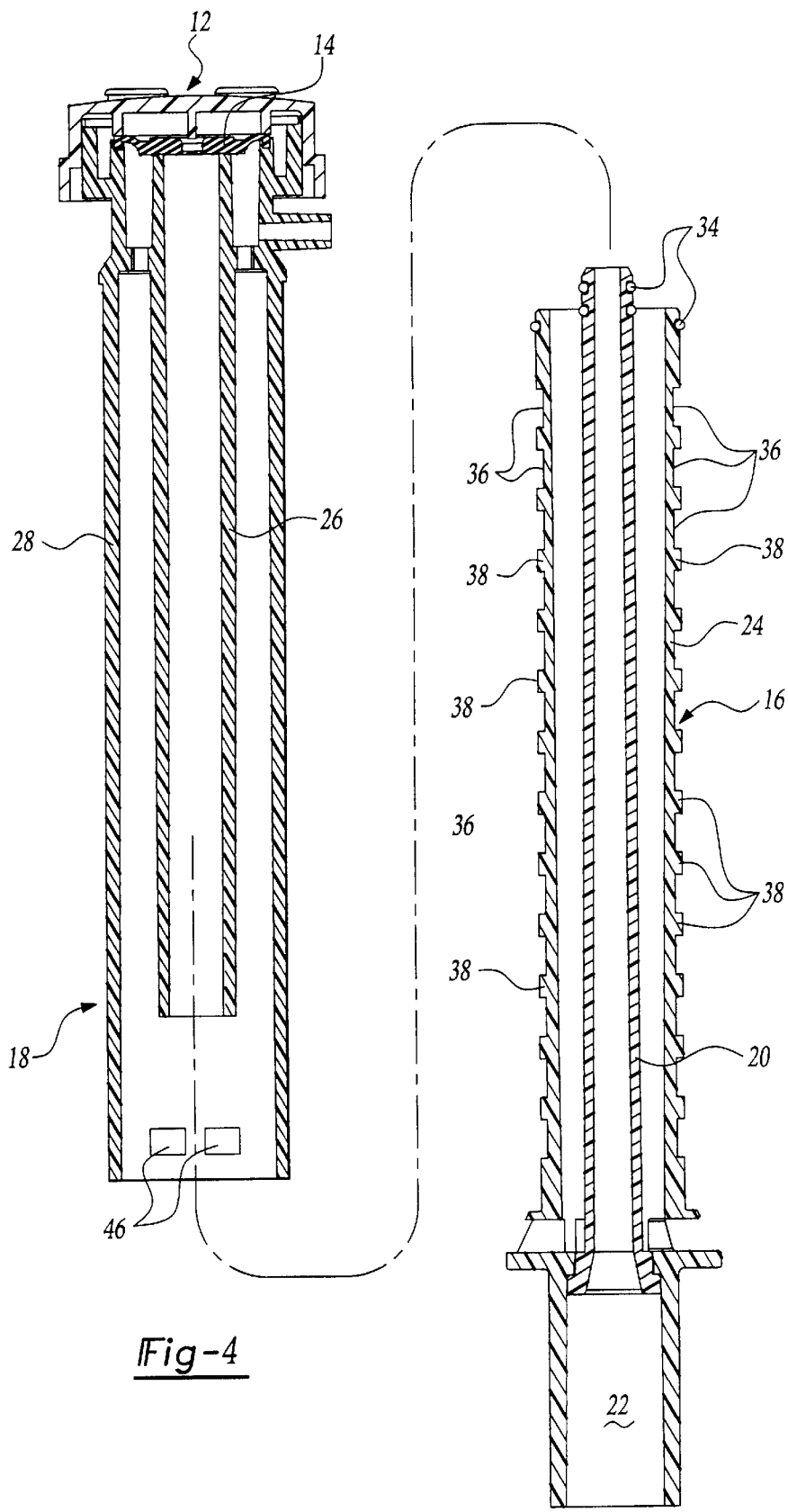
FIG. 4 is an exploded view of the adjustable standpipe.

Referring first to FIG. 1, there is shown a cross-sectional view of an adjustable standpipe 10 embodying the present invention. Adjustment of the standpipe 10 is necessary in order to position the fill valve 12, in particular its associated float, relative to the floor of the toilet tank in order to fill the tank to a predetermined level. The fill valve 12 controls the flow of water into the tank in response to movement of the float associated therewith. Although the fill assembly 12 could be of any known type, the present invention is depicted in conjunction with a diaphragm valve having a diaphragm 14 mounted at the upper end thereof to control fluid flow from an inlet into the tank reservoir. The diaphragm valve 14 opens in response to reduced water levels in the tank such as when the toilet is flushed. In accordance with the present invention as will be subsequently described, the position of the fill valve 12 will vary as the length of the standpipe 10 is adjusted.

Referring now to the drawing figures, the standpipe 10 includes a fixed portion 16 which is secured to the tank floor and an adjustable portion 18 telescopically mounted to the fixed portion 16. The fill assembly 12 is disposed at an upper end of the adjustable portion 18 so as to be carried therewith. As best shown in FIG. 4, the fixed portion 16 of the standpipe 10 includes an inner tube 20 in fluid communication with an inlet port 22 connected to a water supply and an outer tube 24 concentric with the inner tube 20 of the fixed portion 16. Similarly, the adjustable portion 18 of the standpipe 10 includes an inner tube 26 and a concentric outer tube 28. The respective inner tubes 20,26 and outer tubes 24,28 are matingly connected to form an inlet passageway 30 directing fluid to the valve assembly 12 and a discharge passageway 32 directing fluid into the reservoir when the valve 12 is open. O-ring seals 34 disposed on the fixed inner tube 20 and fixed outer tube 24 facilitate sealing engagement between the fixed portion 16 and an adjustable portion 18.

The fixed portion 16 and adjustable portion 18 are selectively telescopically adjustable relative to each other to vary the position of the valve assembly 12 at the upper end of the adjustable portion 18. In order to prevent inadvertent movement of the adjustable portion 18 relative to the fixed portion 16, a locking assembly is provided which fixes the standpipe 10 at any one of a plurality of discrete positions. The locking assembly embodying the present invention connects the mating outer tubes 24 and 28 to prevent relative movement. The fixed outer tube 24 includes a plurality of camming grooves 36 defining the discrete locking positions for the standpipe 10. The camming grooves 36 are spaced longitudinally along the fixed tube 24 and are separated by shoulders 38. The individual camming grooves 36 extend at least partially around the periphery of the fixed outer tube 24. In a preferred embodiment, the discrete camming grooves 36 are formed in pairs extending partially around the periphery of the fixed outer tube 24. The camming grooves 36 include a camming surface 40 extending to a flat locking surface 42 at an inner end of the groove 36. At the opening of the groove 36, a flat portion 44 extends longitudinally substantially the length of the fixed outer tube 24.

As best show in FIG. 8, the adjustable outer tube 28 includes a pair of slots 46 extending through the wall of the tube 28. The slots 46 are preferably formed proximate the lower end of the adjustable outer tube 28. The slots 46 are adapted to receive a locking clip 48 which selectively engages the camming grooves 36 of the fixed tube 24 to prevent telescoping adjustment. The locking clip 48 has a substantially U-shaped configuration with a pair of arms 50. The arms 50 of the locking clip 48 extend through the slots 46 of the adjustable tube 18 to selectively engage the grooves 36 of the fixed tube 24. With the arms 50 positioned in a groove 36, the shoulders 38 prevent longitudinal movement. With the arms 50 positioned along the flat portion 44, telescoping adjustment can be accomplished as will be subsequently described. Two pairs of longitudinal ribs 45 and 47 extend substantially the length of the inner tube 16 to prevent over rotation of the clip 48 in either direction. A longitudinal rib 45 proximate first flat 44 prevents over rotation during disengagement and adjustment. Longitudinal rib 47 proximate second flat 42 prevents over rotation during locking engagement of the clip 48 into the slots.

As best shown in FIGS. 3 and 8, the locking clip 48 preferably includes structural features which facilitate locking engagement between the slidable tube 18 and the fixed tube 24. Formed on an inner surface 58 of the arms 50 are triangular teeth 60 which ensures insertion of the clip 48 into the grooves 36 as the outer tube 18 is rotated. Flanges 62 at the ends of the arms 50 cooperate with corresponding shoulders 64 of the tube 18 to maintain interactive engagement with the adjustable tube 18.

As best shown in FIG. 10, the lower end of the fill tubes are constructed to facilitate assembly of the clip 48 into the tubes 16 and 18. A base portion 100 of the inner tube 16 includes a pair of keys 102 and a base portion 104 of the outer tube 18 includes corresponding slots 106. Insertion of the keys 102 into the slots 106 ensures proper alignment of the tubes 16 and 18 in a fully contracted position for simple insertion of the clip 48. Proximate the base 100 of the inner tube 16, the flat portion 108 is deeper and larger than the flat 44 of the inner tube 16 to facilitate insertion of the clip 48 around the inner tube 16. Once the clip 48 has been inserted, the length of the fill tube can be telescopically adjusted.

As a further alternative, the locking features may be incorporated into the inner surface 66 of the adjustable tube 18 as shown in FIG. 9. Inwardly disposed blocks 68 are formed on the inner surface 66 on opposite sides of the tube 18. The blocks 68 operate similar to the ring 48 in that rotation of the outer tube 18 will cause the blocks 68 to be moved into the grooves 36 preventing longitudinal adjustment of the standpipe. Adjustment may be accomplished simply by rotating the tube 18 to move the blocks 68 out of the grooves 36 and telescopically adjusting the tubes.

Operation of the present invention facilitates selective adjustment of the length of the standpipe 10 and therefore the position of the valve assembly 12 and its associated float member. The length of the standpipe 10 is adjustable along a plurality of discrete positions associated with the grooves 36 formed in the fixed outer tube 24. Nevertheless, the mating telescoping engagement of the outer tubes 24,28 and the inner tubes 20,26 maintains the respective discharge passageway 32 and inlet passageway 30 at every adjustment position.

Beginning with the standpipe 10 in an unlocked position as shown in FIG. 3, the arms 50 of the locking clip 48 are aligned with the flat portions 44 extending along the fixed tube 24. As a result, the tubes may be telescopically adjusted as the arms 50 move along the flat portion 44. Once the desired position of the adjustable portion 18 relative to the fixed portion 16 is attained, the adjustable portion 18 is rotated clockwise causing the locking clip 48 to travel into a groove 36. The clip 48 will move along the camming surface 40 of the groove 36 until it "snaps" into place at the flat locking surface 42 of the groove 36. With the arms 50 of the locking clip 48 positioned with the groove 36, telescoping adjustment is prevented by the shoulders 38 between each of the grooves 36. To readjust the standpipe 10, the adjustable portion 18 is rotated in the opposite, counterclockwise direction until the locking clip 48 is aligned with the longitudinal flat portions 44 on the fixed tube 24. Thus, the present invention provides a simple and convenient mechanism for adjusting the length of a standpipe associated with a toilet flush valve 50 as to optimize the position of the valve within the tank.

The configuration of the individual grooves 36 is designed to provide an audible and tactile indication of the position of the clip 48 relative to the groove 36. With the clip 48 aligned with longitudinal flat portion 44, the outer tube 18 carrying the clip 48 is free to move relative to the inner tube 16. Once the clip 48 is aligned with the desired groove 36, rotation of the outer tube 18 will cause the clip 48 to engage the camming surface 44 providing some resistance to rotation. Finally, as the clip 48 passes to the flat 42, the user will feel and hear the clip 48 snap into the end flat portion 42 signaling proper positioning.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fill valve assembly for selectively filling a fluid reservoir, said fill assembly comprising:

an upright standpipe adapted to be mounted within the fluid reservoir for delivering fluid therethrough, said standpipe includes a fixed tube portion and an adjustable tube portion telescopically attached to said fixed tube portion;

a fill valve mounted to said adjustable tube portion of said standpipe, said valve being movable between a closed portion preventing the flow of fluid and an open position so as to allow the flow of fluid therefrom; and means for adjusting a length of said standpipe along a plurality of discrete positions to vary the position of said fill valve within the reservoir, said means including a plurality of lateral grooves formed in an exterior surface of said fixed tube portion defining said discrete positions and a locking clip mounted to said adjustable tube portion selectively engageable with said lateral grooves to prevent telescoping movement of said adjustable tube portion relative to said fixed tube portion;

said fixed tube portion including opposing flat surfaces extending longitudinally along said fixed tube portion whereby rotation of said adjustable tube portion in a first direction aligning said locking clip with said flat surfaces facilitates telescoping adjustment of said adjustable tube portion relative to said fixed tube portion and rotation of said adjustable tube portion in a second direction engaging said locking clip with one of said lateral grooves prevents telescoping adjustment.

2. The fill assembly as defined in claim 1 wherein each of said lateral grooves includes a locking flat at an innermost end of said lateral grooves and a camming surface between said locking flat and said flat surface extending longitudinally along said fixed tube portion.

3. The fill assembly as defined in claim 1 wherein said locking clip has a U-shaped configuration with arms extending through said adjustable tube portion to selectively engage said fixed tube portion.

4. The fill assembly as defined in claim 2 wherein said arms of said locking clip have inwardly disposed teeth to ensure insertion of said locking clip into one of said lateral grooves.

5. The fill assembly as defined in claim 1 wherein said adjusting means includes a pair of locking blocks formed on an interior surface of said adjustable tube portion for selective engagement with one of said lateral grooves of said fixed tube portion.

6. The fill assembly as defined in claim 4 and further comprising an enlarged flat surface proximate a base portion of said fixed tube to facilitate insertion of said locking clip.

7. A fill valve assembly for selectively filling a fluid reservoir, said fill valve assembly comprising:

an upright standpipe adapted to be mounted within the fluid reservoir for delivering fluid therethrough;

a fill valve mounted to an upper end of said standpipe for controlling the flow of fluid into the fluid reservoir; and means for adjusting the length of said standpipe along a plurality of discrete positions, said standpipe including a first fixed tube portion having a plurality of spaced apart lateral grooves defining said discrete positions of adjustment and a second adjustable tube portion matingly mounted to said first fixed tube portion, said second tube having locking means selectively engaging said grooves to fix said length of said standpipe and said first fixed tube portion including opposing flat surfaces extending longitudinally along said fixed tube portion whereby rotation of said adjustable tube portion in a first direction aligning said locking means with said flat surfaces facilitates telescoping adjustment of said adjustable tube portion relative to said fixed tube portion and rotation of said adjustable tube portion in a second direction engaging said locking means with one of said lateral grooves prevents telescoping adjustment.

8. The fill assembly as defined in claim 7 wherein said plurality of lateral grooves are formed in an exterior surface of said fixed tube portion defining said discrete positions, said lateral grooves extending at least partially around the circumference of said fixed tube portion.

9. The fill assembly as defined in claim 7 wherein said locking means includes a locking clip mounted to said adjustable tube portion selectively engageable with said lateral grooves to prevent telescoping movement of said adjustable tube portion relative to said fixed tube portion.

10. The fill assembly as defined in claim 7 wherein said locking means includes diametrically opposed locking blocks formed on an interior surface of said adjustable tube portion, said locking blocks selectively engageable with one of said lateral grooves to prevent telescoping movement of said adjustable tube portion relative to said fixed tube portion.

11. The fill assembly as defined in claim 8 wherein each of said lateral grooves includes a locking flat at an innermost end of said lateral grooves and a camming surface between said locking flat and said flat surface extending longitudinally along said fixed tube portion.

12. The fill assembly as defined in claim 9 wherein said locking clip has a U-shaped configuration with arms extending through said adjustable tube portion to selectively engage said fixed tube portion.

13. The fill assembly as defined in claim 7 wherein said fill valve is mounted to an upper end of said adjustable tube portion such that adjustment of the length of said standpipe varies the position of said fill valve within the reservoir.

14. The fill assembly as defined in claim 13 wherein said fill valve is movable between a closed position preventing the flow of fluid and an open position so as to allow the flow of fluid through the fill assembly.

15. The fill assembly as defined in claim 14 and further comprising an enlarged flat surface proximate a base portion of said fixed tube to facilitate insertion of said locking clip.

16. A fill valve assembly for selectively filling a fluid reservoir, said fill valve assembly comprising:

an adjustable standpipe adapted to be mounted within the fluid reservoir for delivering fluid therethrough, said standpipe including a fixed tube portion adapted to be mounted within the fluid reservoir and an adjustable tube portion telescopically mounted on said fixed tube portion;

a fill valve mounted to an upper end of said adjustable tube portion for controlling the flow of fluid through said fill assembly; and means for adjusting the length of said standpipe by adjusting the position of said adjustable tube portion relative to said fixed tube portion along a plurality of discrete positions, said fixed tube portion including a plurality of spaced apart lateral grooves defining said discrete positions of adjustment, said adjustable tube portion including locking means selectively engaging said grooves to fix said length of said standpipe;

said fixed tube portion includes opposing flat surfaces extending longitudinally along said fixed tube portion whereby rotation of said adjustable tube portion in a first direction aligning said locking means with said flat surfaces facilitates telescoping adjustment of said adjustable tube portion relative to said fixed tube portion and rotation of said adjustable tube portion in a second direction engaging said locking means with one of said lateral grooves prevents telescoping adjustment.

17. The fill assembly as defined in claim 16 wherein said plurality of lateral grooves are formed in an exterior surface of said fixed tube portion defining said discrete positions, said lateral grooves extending at least partially around the circumference of said fixed tube portion.

18. The fill assembly as defined in claim 17 wherein said locking means includes a locking clip mounted to said adjustable tube portion selectively engageable with said lateral grooves to prevent telescoping movement of said adjustable tube portion relative to said fixed tube portion.

19. The fill assembly as defined in claim 18 wherein each of said lateral grooves includes a locking flat at an innermost end of said lateral grooves and a camming surface between said locking flat and said flat surface extending longitudinally along said fixed tube portion.

20. The fill assembly as defined in claim 19 and further comprising an enlarged flat surface proximate a base portion of said fixed tube to facilitate insertion of said locking clip.

\* \* \* \* \*